United States Patent [19]
Okubo

[11] Patent Number: 5,455,715
[45] Date of Patent: Oct. 3, 1995

[54] PORTABLE COLLIMATOR FOR ADJUSTING VIDEO CAMERAS

[75] Inventor: Hatsuo Okubo, Yokohama, Japan

[73] Assignee: Victor Company of Japan, Ltd., Yokohama, Japan

[21] Appl. No.: 112,678

[22] Filed: Aug. 26, 1993

[30] Foreign Application Priority Data

Aug. 27, 1992 [JP] Japan ................... 4-065885 U

[51] Int. Cl.⁶ ................................. G02B 7/02
[52] U.S. Cl. .................. 359/827; 359/830; 285/414
[58] Field of Search .................... 359/424, 428, 359/641, 808, 809, 811, 815, 819–823, 827, 830; 351/239, 243, 244; 285/405, 414

[56] References Cited

U.S. PATENT DOCUMENTS 4,291,944  9/1981  Nomura ........................... 359/827
4,740,058  4/1988  Hori et al. ....................... 359/827

FOREIGN PATENT DOCUMENTS

63-292781  11/1988  Japan.

Primary Examiner—Loha Ben
Assistant Examiner—James Phan
Attorney, Agent, or Firm—Michael N. Meller

[57] ABSTRACT

Compact and lightweight portable collimator for adjusting an optical system of a video camera is disclosed, the collimator comprises a chart piece holding a chart pattern for producing an image of the chart pattern placed at a focal point of a convex lens which converts a light from the chart pattern into a beam of parallel light and projecting the beam toward the video camera, a cylinder for housing the chart piece and the convex lens, and coupling device rotatably coupling the cylinder to a lens barrel of the video camera so that an orientation of the chart pattern can be changed and the optical system of the video camera can be adjusted to a distance of infinity. The chart piece may be made replaceable so as to place the chart pattern within a focal length of the convex lens to optically synthesize an object placed closer than the infinite distance with respect to an objective lens of the video camera.

8 Claims, 7 Drawing Sheets

PORTABLE COLLIMATOR FOR ADJUSTING VIDEO CAMERAS

BACKGROUND OF THE INVENTION

1. Field of the Invention

The present invention relates to a portable collimator for adjusting video cameras, and more particularly to an improved compact and light weight collimator adapted to use with video cameras for adjusting an optical system of the video cameras.

2. Description of the Prior Art

Upon servicing a video camera involving such as an imaging device, an optical system of the video camera often requires adjustments, this is for verifying that a light of the taking object is properly focused on an imaging plane of the imaging device in the video camera. In order to adjust the optical system to a distance of "infinity", a parallel light from an object is necessary but is not always available in the normal servicing circumstances. Instead, an optical device called "collimator" is used to produce such an artificial "parallel light" from an object which is often a test chart built into the collimator.

Figure 1:
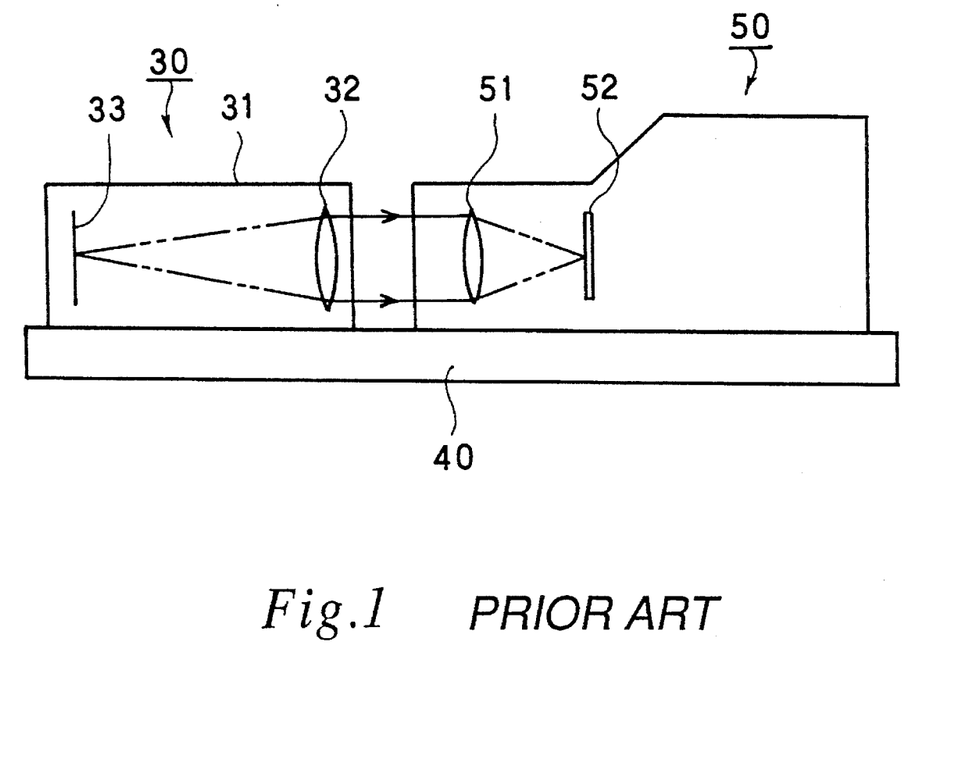
FIG. 1 shows a schematic view of a collimator of prior art.

FIG. 1 shows a collimator of prior art denoted by a numeral 30, in FIG. 1, the collimator 30 is built on a bed 40 of sturdy material, a convex lens 32 and an object 33 placed at a focal point of the convex lens 32 are housed in a housing 31, and a light from the object 33 is transformed to a parallel light by the convex lens 32 and is projected out of the housing 31 and to a video camera 50 to be adjusted. The video camera 50 is tentatively installed in the bed 40 upon every servicing by a mounting fixture (not shown). Numeral 51 denotes an objective lens of the video camera 50, and 52 is an image sensor such as a CCD unit installed in the video camera 50. The mounting fixture is not designed exclusively to video cameras but is normally a universal type to accept various types of optical apparatuses such as still cameras and telescopes and the like, for this reason, the fixture is a bulky complex hardware which makes a video camera mounting an awkward and time consuming work, under this installation as shown in FIG. 1, the optical system i.e. a position of the objective lens 51 and/or a position of the image sensor 52 or the like, is adjusted for manufacturing each of mass produced video cameras. This led the present invention by the present inventor.

SUMMARY OF THE INVENTION

Accordingly, it is a general object of the present invention to provide an improved collimator, in which aforementioned problems of bulky installation and time consuming work have been overcome.

Another and specific object of the present invention is to provide a compact and lightweight portable collimator which is mechanically and directly coupled to a lens barrel of video cameras to be adjusted.

Still another and specific object of the present invention is to provide a portable collimator which comprises a chart piece holding a chart pattern for producing an image of the chart pattern placed at a focal point of a convex lens which converts a light from the chart pattern into a beam of parallel light and projecting the beam toward the video camera, a cylinder for housing the chart piece and the convex lens, and coupling device rotatably coupling the cylinder to a lens barrel of the video camera so that an orientation of the chart pattern can be changed and the optical system of the video camera can be adjusted to a distance of infinity. The chart piece is replaceable so as to place the chart pattern within a focal length of the convex lens to optically synthesize an object placed closer than the infinite distance with respect the video camera.

Other objects and further features of the present invention will be apparent from the following detailed description with respect to preferred embodiments of the invention when read in conjunction with the accompanying drawings.

DETAILED DESCRIPTION OF THE PREFERRED EMBODIMENT

Portable collimator according to the present invention will be described in detail with reference to the accompanying drawings, in which same reference numerals and symbols are used to denote like or equivalent elements used in the aforementioned prior art, and detailed explanation of such elements are omitted for simplicity.

Figure 2:
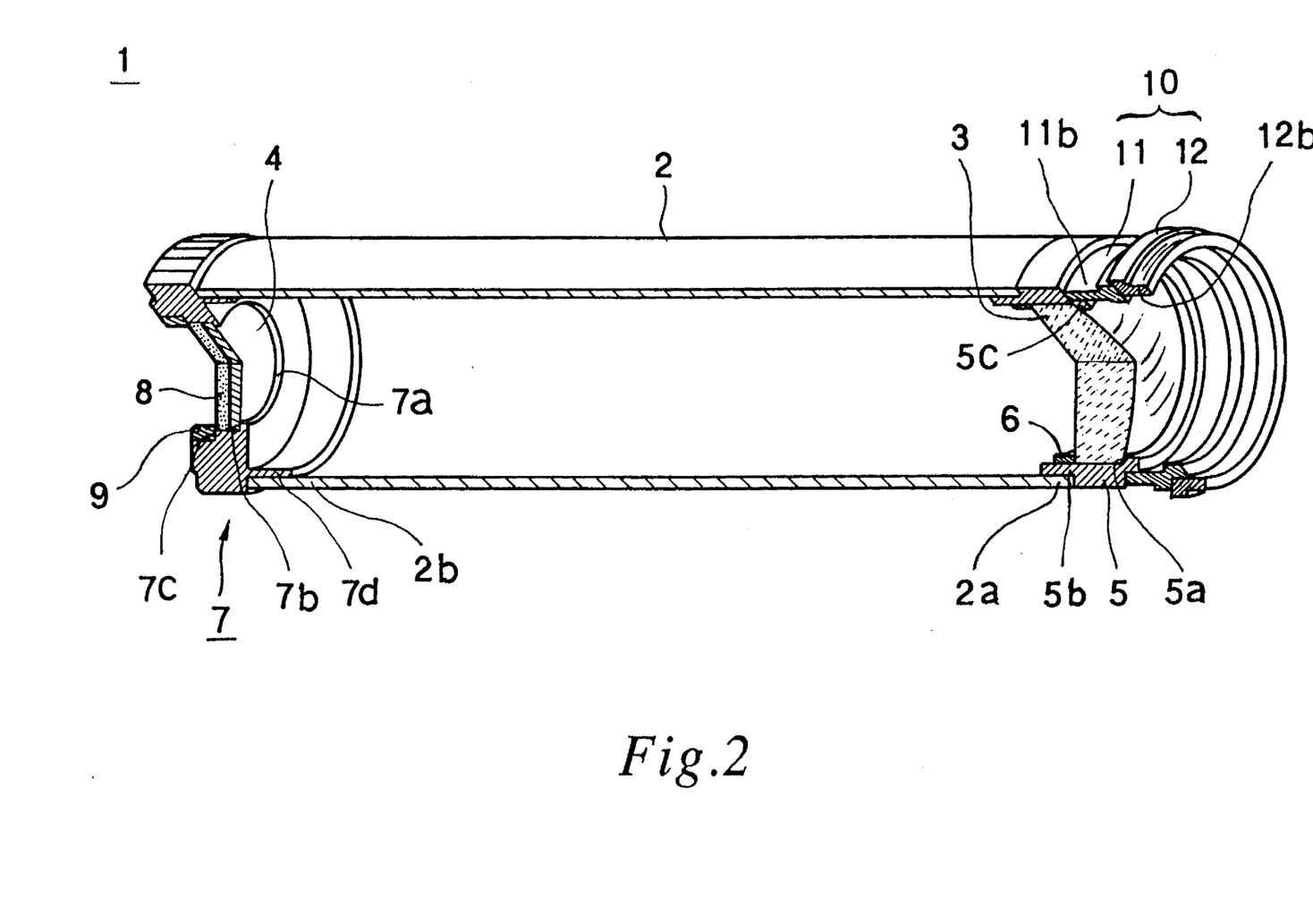
FIG. 2 shows a perspective view of portable collimator according to a first embodiment of the present invention.

FIG. 2 shows a perspective view of portable collimator for adjusting an optical system of video cameras according to a first embodiment of the present invention. In FIG. 2, a numeral 2 denotes a cylinder made of lightweight metal for holding and shielding an optical system inside from environment, at both approximate ends of the cylinder 2, there installed respectively a convex lens 3 and a chart 4 opposing each other, where the chart 4 is located at a focal point of the convex lens 3 which is held in a mounting collar 5 by being interposed between a step part 5a of the mounting collar 5 and a retainer 6 of ring shape screwed inside the mounting collar 5. Mounting collar 5 holding the convex lens 3 has a flange 5b which is screwed inside an end portion 2a of the cylinder 2 so that the convex lens 3 is securely mounted on the cylinder 2.

Figure 3:
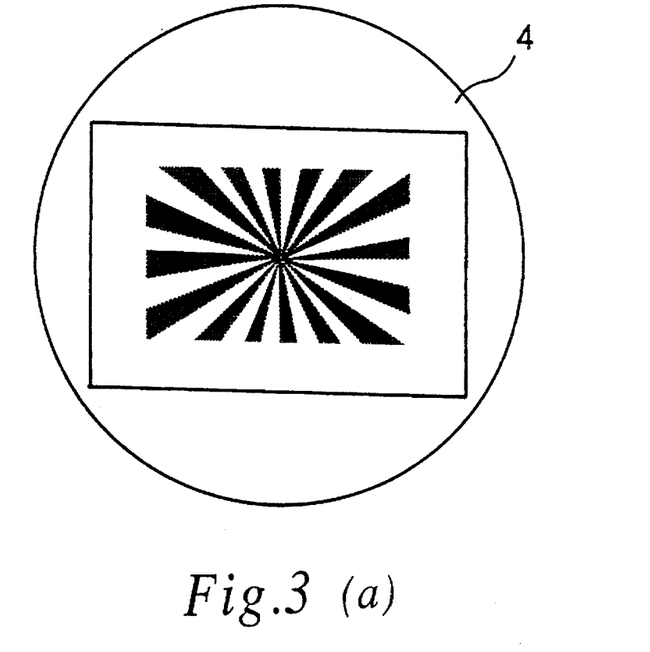
FIGS. 3(A) and 3(B) respectively show exemplary test charts which may be selectively mounted on embodiments according to the present invention.

FIGS. 3(A) and 3(B) respectively show exemplary test charts which may be selectively mounted on the portable collimator of the present invention.

The chart 4 is typically a geometrical pattern depicted on a transparent flat panel as shown in FIGS. 3(A) and 3(B), of which the one shown in FIG. 3(A) is used for observing resolution of an optical system of video cameras and another shown in FIG. 3(B) is a gray scale having different photographic densities. Further, the chart 4 can be a color bars (not shown) or any other pattern for adjusting the optical system of video cameras. The chart 4 and a semi-transparent (frosted) glass plate 8 for introducing an outside light uniformly to the chart 4, are held in a chart piece 7 having an aperture 7a by being interposed between a step part 7b thereof and a retainer 9 of ring shape screwed inside of another step part 7c provided on the chart piece 7. The chart piece 7 further comprises a flange 7d which is screwed inside an another end portion 2b of the cylinder 2, so that the chart 4 is mounted to the cylinder 2 together with the semi-transparent glass plate 8. In this portable collimator 1 of simple construction, a light from the chart 4 carrying an image thereof as a result of being illuminated by the outside light coming through the semi-transparent glass plate 8, advances through the aperture 7a and is transformed by the convex lens 3 into a beam of parallel light projected out of the portable collimator 1.

Figure 4:
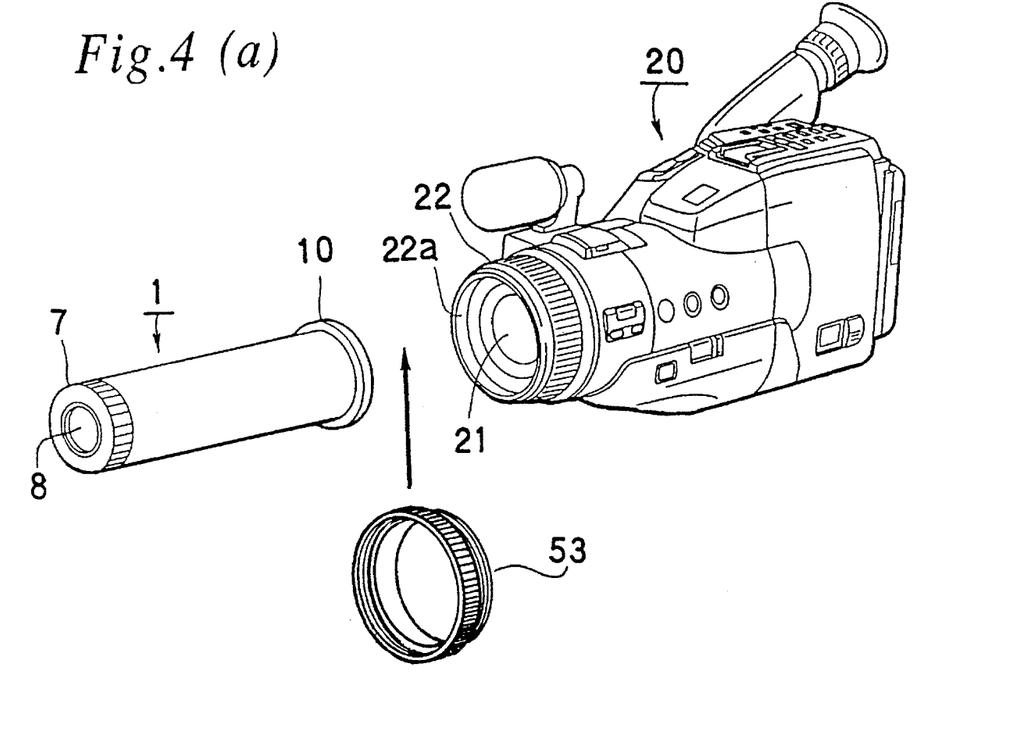
FIGS. 4(A) and 4(B) respectively show before and after the portable collimator of the present invention being coupled to a video camera for its optical system adjustments.

FIGS. 4(A) and 4(B) respectively show before and after the portable collimator of the present invention being installed in a video camera for its optical system adjustments. And, FIG. 5 shows a detail of mounting section of the portable collimator of the present invention such as shown in FIG. 2.

Figure 5:
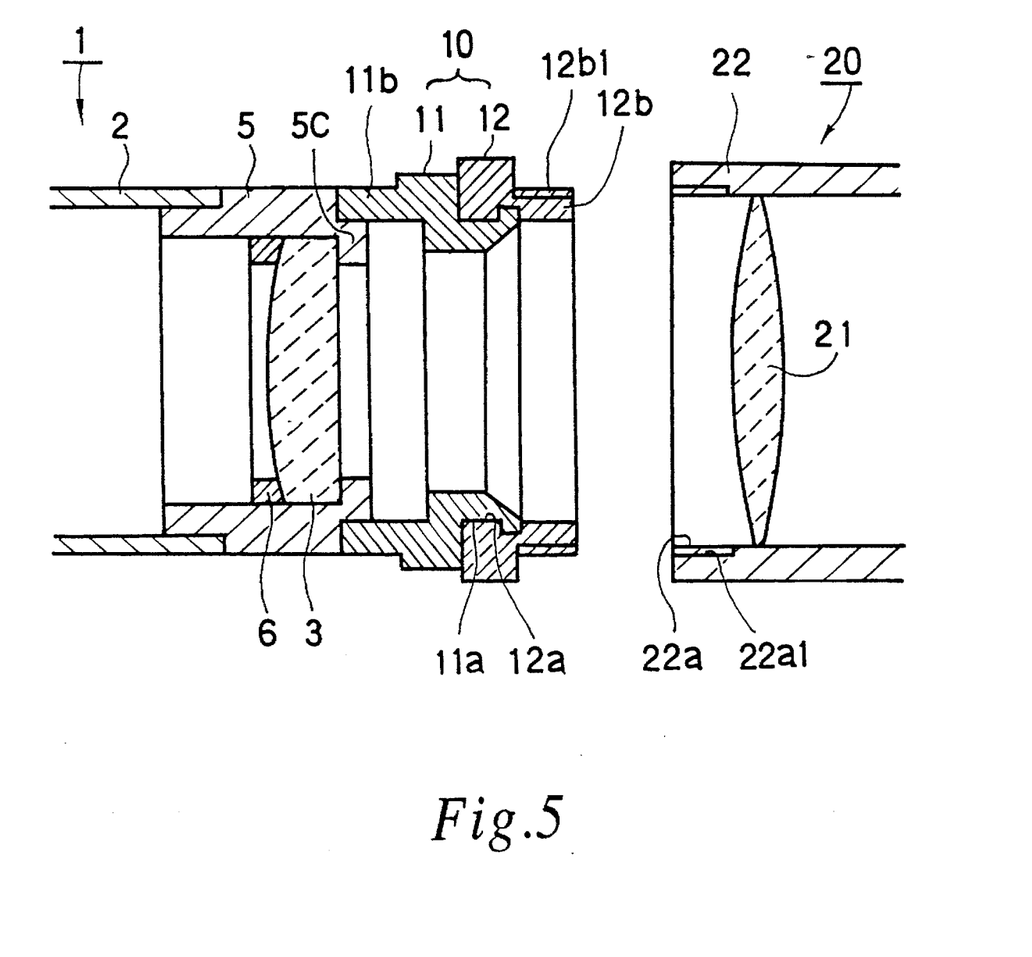
FIG. 5 shows a detail of mounting section of the portable collimator according to the present invention in relation to the video camera to be adjusted by being mounted with the portable collimator of the present invention.

Referring to FIGS. 4(A), 4(B) and 5, description is now given to a coupling device 10 which couples the portable collimator 1 to a video camera 20 at a lens barrel of the objective lens 21 to make the portable collimator 1 detachable to the video camera 20. On a conventional video camera such as denoted by 20 in FIG. 4(A), there provided a screw 22a at a front inside portion of a lens-barrel 22 of the objective lens 21 for mounting an optical filter. By utilizing the screw 22a, the portable collimator 1 is coupled to the video camera 20 by means of the coupling device 10 which is an integral part of the collimator 1. As shown in FIG. 5, the coupling device 10 comprises two rings 11 and 12 which are rotatably jointed each other at their interfaces 11a and 12a respectively. The ring 11 of the coupling device 10 has a flange portion 11b screwed on an end portion 5c of the mounting collar 5 so that the coupling device 10 is fixed to the cylinder 2. The ring 12 is extended to form a flange 12b, a screw 12b1 is provided on an outer periphery of the flange 12b for engaging with the screw 22a of the lens-barrel 22 of the video camera 20, so that the portable collimator 1 is coupled yet detachable to the video camera 20 as shown in FIG. 4(B). In order to couple the portable collimator 1 to various video cameras having different lens barrel sizes respectively, an adapter ring of conventional construction such as shown in FIG. 4(A) denoted as 53 may be used between the flange 12b and the lens barrel 22.

Figure 6:
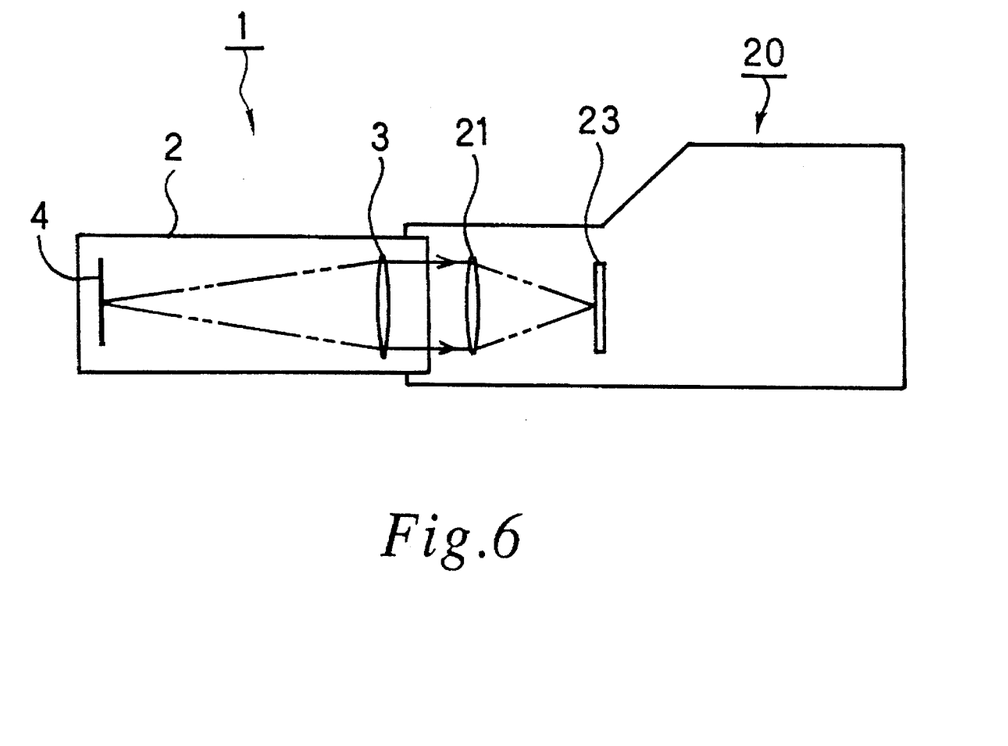
FIG. 6 shows how an image of the test chart shown in FIG. 3(A) or 3(B) is formed on an imaging device of the video camera when the portable collimator of present invention built with the test chart is mounted on the video camera for adjustment.

FIG. 6 shows how an image of the test chart as shown in FIG. 3(A) or 3(B) is formed on an imaging device of the video camera when the portable collimator of present invention built with the test chart is coupled to video camera for adjustment.

Referring to FIG. 6, with an arrangement of the portable collimator 1 being coupled to the video camera 20 as shown, it is possible to adjust the objective lens 21 for a distance of "infinity" by observing and verifying the image of the chart 4 being formed correctly on an imaging device 23 since the objective lens 21 receives the image of the chart 4 as a beam of parallel light in this arrangement where the chart 4 is located at the focal point of the convex lens 3.

It should be noted the fact that the two rings 11 and 12 are rotatably coupled each other which allows the chart 4 held in the cylinder 2 to rotate with respect to the imaging device 23 by manually rotating the cylinder 2 so that an orientation of the chart 4 can be changed as desired depending upon a configuration of the pattern of the chart 4.

Figure 7:
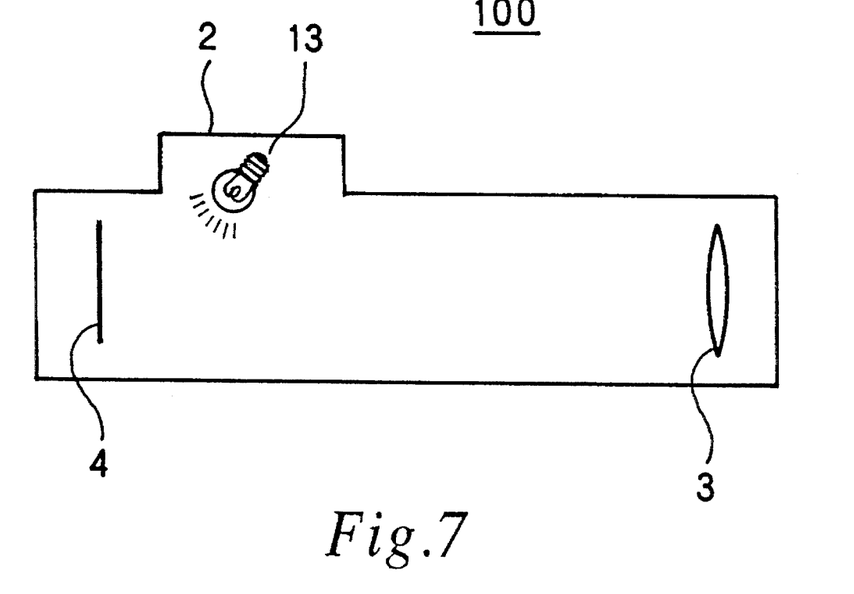
FIG. 7 shows a portable collimator of a second embodiment of the present invention.

FIG. 7 shows a portable collimator 100 of a second embodiment of the present invention in which same reference numerals and symbols are used to denote like or equivalent elements used in the first embodiment, and detailed explanation of such elements are omitted for simplicity.

When the chart 4 is depicted on an opaque material, such chart 4 may be illuminated locally within the cylinder 2 by a lamp 13 as shown in FIG. 7, in this arrangement, the coupling device 10 is still provided but not shown, however, the semi-transparent glass plate 8 may be omitted from the portable collimator 100.

Figure 8:
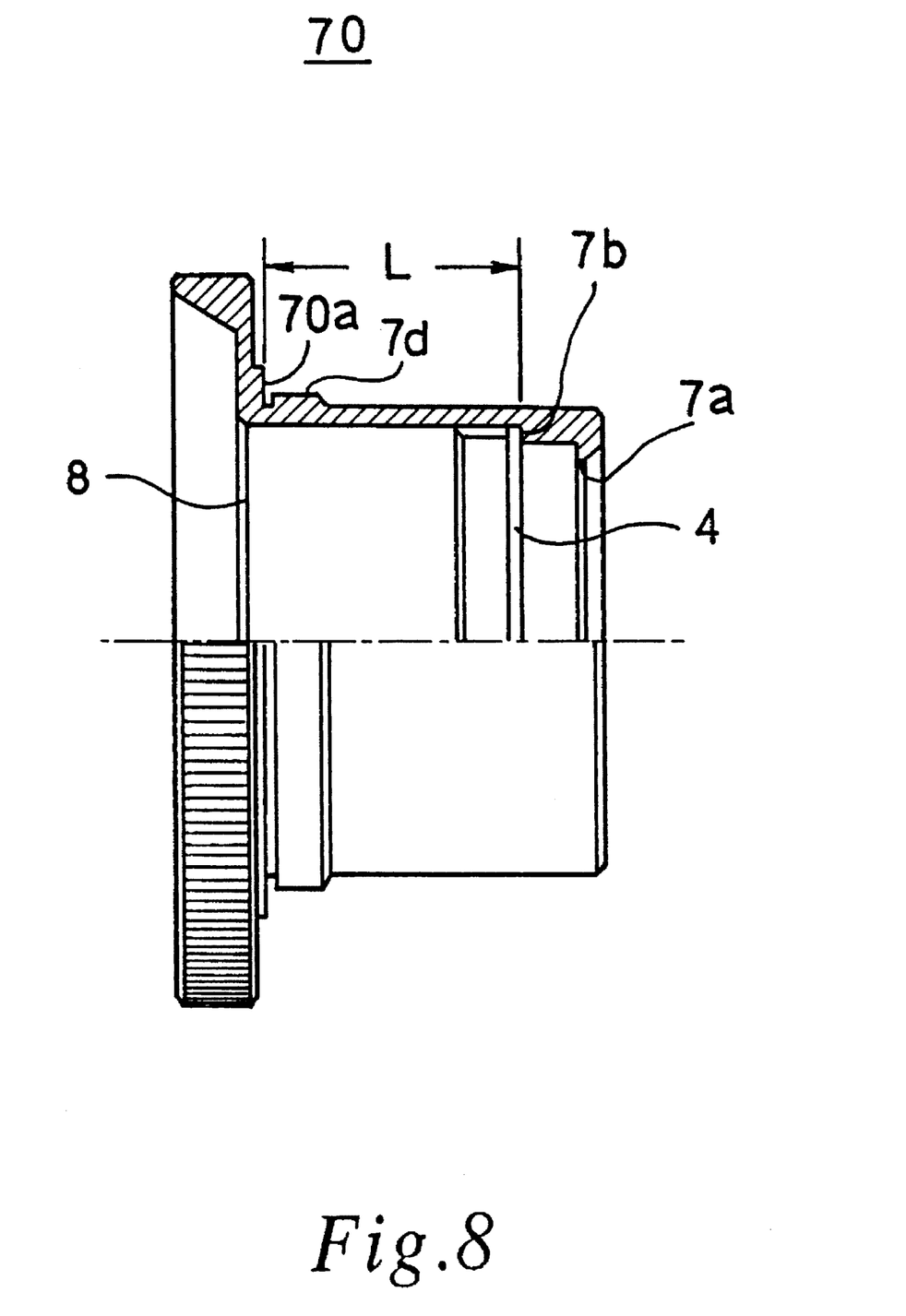
FIG. 8 shows a modified version of a chart piece which may be mounted on the portable collimator according to the present invention.

FIG. 8 shows a chart piece 70 which is a modified version of the chart piece 7 and it may be installed, in place of the chart piece 7, in the portable collimator 1 or 100 shown respectively in FIGS. 2 and 7. In the chart piece 70, the chart 4 is located deeper into the cylinder 2 when the chart piece 70 is mounted thereon, in other words, the chart 4 is located within a focal length of the convex lens 3 or located closer to the convex lens 3 in comparison with the chart piece 7 being mounted on the cylinder 2 holding the convex lens 3 of same focal length. By mounting this chart piece 70 on the collimator 1 or 100, when coupled to the video camera 20, it optically synthesizes an object placed closer than "infinity" with respect to the objective lens 21 so that it allows the objective lens 21 being adjusted to a shorter distance than "infinity". As a matter of fact, the chart piece 70 as shown in FIG. 8 is used for adjusting the objective lens 21 for a distance of 1 meter. By changing a distance L between the chart 4 and a mounting flange 70a shown in FIG. 8, various distances for lens adjustments can be realized.

Accordingly in the portable collimator of the present invention, the work for installing the collimator in a video camera is extremely simple as shown in FIG. 4(B) and not time consuming in contrast to the use of the prior art collimator shown in FIG. 1, so that the adjustments of the optical system of the video camera becomes highly efficient because of the fact that the portable collimator of the present invention is compact, lightweight and is coupled directly to the lens barrel of the video camera by simply screwing the coupling device 10 thereto, and the chart 4 is replaceable with the one shown in FIG. 3(A) for a resolution adjustment or in FIG. 3(B) for gray scale (linearity) adjustment or with other patterns so that the video camera coupled to the portable collimator of the present invention can undergo a resolution measurement or a brightness adjustment or the like depending on the replaced chart pattern in addition to the aforementioned optical system adjustments. In such a case, an orientation of the chart 4 can be changed as desired by simply turning the cylinder 2 of the portable collimator 1 or 100. Further, as this portable collimator is designed exclusively to video cameras, a manufacturing cost of the collimator is kept low and it does not take room for adjusting the video camera, thus the portable collimator of the present invention is quite advantageous in the video camera field servicing.

In the first and second embodiments of the portable collimator 1 and 100 of the present invention, the cylinder 2 together with the chart piece 7 is made rotatable with respect to the ring 12 which is screwed in thus fixed to the lens barrel 22 of the video camera, however the chart piece 7 itself may be made rotatable with respect to the cylinder 2 by providing a coupling device similar to the coupling device 10.

What is claimed is:

1. Portable collimator adapted for use with a video camera for adjusting an optical system of the video camera, said portable collimator comprising:

chart means for holding a chart pattern for producing an image of said chart pattern;

convex lens means for converting a light from said image of said chart pattern into a beam of approximate parallel light and for projecting said beam of approximate parallel light toward the video camera, said chart means being placed at a proximity of a focal point of said convex lens means;

cylinder means for housing said chart means and said convex lens means, said chart means being placed approximately at a first end of said cylinder means, said convex lens means being placed approximately at a second end of said cylinder means;

coupling means for directly and removably coupling said cylinder means at said second end to a lens barrel of the video camera; and chart pattern orientation change means for manually changing an orientation of said chart pattern of said chart means, wherein said chart pattern is placed exactly at said focal point of said convex lens means so that said light from said image of said chart pattern is converted into a beam of parallel light and said optical system of the video camera is adjusted to a distance of infinity.

2. Portable collimator claimed in claim 1 in which said charge pattern orientation change means comprises a pair of rings rotatably coupled to each other and said charge pattern orientation means is provided in said coupling means to allow said cylinder means to rotate with respect to said coupling means so that an orientation of said chart means is changed manually.

3. Portable collimator claimed in claim 1 in which said chart means is replaceably installed in said cylinder means and said chart pattern is located within a focal length of said convex lens means when said chart means is installed in said cylinder means.

4. Portable collimator claimed in claim 1 further comprising an adapter ring to be interposed between said coupling means and said lens barrel where diameters of said coupling means and said lens barrel are different from each other.

5. Portable collimator claimed in claim 1 in which said chart pattern of said chart means is depicted on a transparent flat panel, and a light from said chart pattern carrying an image thereof as a result of being illuminated by an outside light is incident upon said convex lens.

6. Portable collimator claimed in claim 5 in which a frosted glass plate is provided on said chart pattern depicted on the transparent flat panel to introduce an outside light uniformly to said chart pattern.

7. Portable collimator claimed in claim 1 in which said chart pattern of said chart means is depicted on an opaque material and is illuminated within said cylindrical means by a light source provided therein so that reflected light from said chart pattern is incident upon said convex lens.

8. Portable collimator claimed in claim 1 in which said chart pattern orientation means comprises means for rotating said chart pattern with respect to the said cylinder means so that an orientation of said chart pattern is manually changed.

* * * * *